(12) United States Patent
Giammarresi (10) Patent No.: US 8,024,761 B1
(45) Date of Patent: Sep. 20, 2011

(54) METHOD AND APPARATUS OF LOAD SHARING AND FAULT TOLERANCE IN AN INTERACTIVE VIDEO DISTRIBUTION SYSTEM

(75) Inventor: Tom Giammarresi, Union City, CA (US)

(73) Assignee: Cox Communications, Inc., Atlanta, GA (US)

( * ) Notice: Subject to any disclaimer, the term of this patent is extended or adjusted under 35 U.S.C. 154(b) by 906 days.

(21) Appl. No.: 09/458,897

(22) Filed: Dec. 10, 1999

Related U.S. Application Data

(60) Provisional application No. 60/127,337, filed on Apr. 1, 1999.

(51) Int. Cl.
 *H04N 7/173* (2006.01)
(52) U.S. Cl. ............... 725/91; 725/93; 725/116; 714/10
(58) Field of Classification Search .................. 714/1, 2, 714/4, 6, 10–13; 718/105; 709/164, 217–231; 725/9–16, 60, 61, 78, 91–94, 114–116, 144–146
See application file for complete search history.

(56) References Cited

U.S. PATENT DOCUMENTS

| | | | | |
|---|---|---|---|---|
| 4,700,348 A * | 10/1987 | Ise et al. ................... 340/825.01 |
| 5,155,845 A * | 10/1992 | Beal et al. ......................... 714/6 |
| 5,371,852 A * | 12/1994 | Attanasio et al. ............. 709/245 |
| 5,479,396 A * | 12/1995 | Kusano ......................... 370/217 |
| 5,646,676 A * | 7/1997 | Dewkett et al. ................. 725/92 |
| 5,774,668 A * | 6/1998 | Choquier et al. ............. 709/223 |
| 5,790,176 A * | 8/1998 | Craig ............................ 725/115 |
| 5,812,748 A * | 9/1998 | Ohran et al. ...................... 714/4 |
| 5,815,194 A * | 9/1998 | Ueda ............................ 725/100 |
| 5,845,328 A * | 12/1998 | Maya et al. .................... 711/162 |
| 5,862,312 A * | 1/1999 | Mann et al. ........................ 714/6 |
| 5,892,910 A * | 4/1999 | Safadi ........................... 709/217 |
| 5,892,915 A * | 4/1999 | Duso et al. .................... 709/219 |
| 5,918,017 A * | 6/1999 | Attanasio et al. ............. 709/224 |
| 5,928,367 A * | 7/1999 | Nelson et al. ..................... 714/6 |
| 5,978,381 A * | 11/1999 | Perlman et al. ............... 370/432 |
| 6,002,687 A | 12/1999 | Magee et al. .................. 370/394 |
| 6,195,680 B1 * | 2/2001 | Goldszmidt et al. .......... 709/203 |
| 6,240,555 B1 * | 5/2001 | Shoff et al. .................... 725/110 |
| 6,371,852 B1 * | 4/2002 | Acres .............................. 463/25 |
| 6,378,129 B1 * | 4/2002 | Zetts .............................. 725/94 |
| 6,418,557 B1 * | 7/2002 | Otani ............................. 725/96 |
| 6,480,551 B1 * | 11/2002 | Ohishi et al. .................. 375/260 |
| 6,782,416 B2 * | 8/2004 | Cochran et al. ............... 709/208 |
| 2003/0204852 A1 * | 10/2003 | Fenwick et al. ................ 725/83 |

* cited by examiner

*Primary Examiner* — Annan Q Shang
(74) *Attorney, Agent, or Firm* — Merchant & Gould (57) ABSTRACT

A method and apparatus for load sharing and increasing fault tolerance at a head-end of an interactive information distribution system during a subscriber's video session. A primary head-end controller processes video session data to manage the distribution of streamed video information to a subscriber. In the event of a failure at the primary head-end controller, a secondary head-end controller continues to process session-state data, with minimal interruption to the subscriber's video session.

20 Claims, 7 Drawing Sheets

METHOD AND APPARATUS OF LOAD SHARING AND FAULT TOLERANCE IN AN INTERACTIVE VIDEO DISTRIBUTION SYSTEM

CROSS REFERENCE TO RELATED APPLICATIONS

This application claims the benefit of U.S. Provisional Application No. 60/127,337, filed Apr. 1, 1999, which is hereby incorporated herein by reference in its entirety.

BACKGROUND OF THE INVENTION

1. Field of Invention

The present invention relates to an interactive information distribution system. More particularly, the invention relates to a method and apparatus for improving sharing of the processing loads and increasing the fault tolerance at each of a plurality of head-ends in an information distribution system.

2. Description of the Background Art

Video distribution systems typically utilize a plurality of cable head-ends. A head-end serves as a distribution point for a designated "neighborhood" of subscribers. Subscriber requests for video information, such as movies, are made by a subscriber using a remote control device to select from a menu of available titles displayed on a display device. After selection by a subscriber, a request for the selected video information is sent to the local head-end supporting the subscriber. The requested video information is then transmitted from the head-end to the subscriber for viewing. A typical head-end comprises a video server system that contains subsystems for managing, storing and distributing the video content.

In a system comprising a large number of subscribers, each head-end experiences a high level of activity. This typically results in delays in responding to subscriber requests. In addition, data processing and/or transmission errors increase as the demand placed upon the head-end increases. For example, physical hardware errors, such as those caused by thermal stresses created during component over-utilization, may result in unacceptable viewing experiences for the subscriber.

Therefore, there is a need in the art for more robust head-end functionality within an information distribution system by distributing head-end processing functions among a plurality of processing elements in a manner that provides increased fault tolerance and, ideally, reduced system latency.

SUMMARY OF INVENTION

The disadvantages heretofore associated with the prior art are overcome by the present invention of an apparatus and method suitable for use in an information server, such as a video-on-demand system head-end. The apparatus and method provide processor load sharing by incorporating redundant hardware and software at the head-end. In this manner, redundant hardware and software at the head-end may share processing duties, as well as advantageously increase fault tolerance, so as to minimize the negative effects of a failure at one of the redundant components.

In an exemplary embodiment of the invention, a system head-end comprises subsystems that are used to manage, store, and distribute video content. These subsystems include a stream server, a video content storage device, numerous managing modules providing various system management functions, and at least two head-end controllers to process and store session-state data executed by the managing modules. The data stored at each head-end controller is available for access by the other head-end controllers by either replicating the data onto a storage device of the other head-end controller or linking each storage device through a network to provide shared data access.

The data processing and delivery load is divided evenly amongst the head-end controllers. Each head-end controller is dedicated to a plurality of access controllers. The access controllers are in turn dedicated to a plurality of subscriber set-top boxes. The set top boxes provide a subscriber access to the VOD system as well as to decode video information supplied to the subscriber. In the preferred embodiment having two head-end controllers, a first head-end controller provides session-state management for one-half of the access controllers and their respective subscriber set-top boxes, while the second head-end controller provides session-state management for the remaining access controllers and their respective set-top boxes.

In the event of a failure in either head-end controller, the remaining operational head-end controller will service all of the access controllers and corresponding set-top boxes. Successful operations are accomplished by the processing of the data from the failed head-end controller, which was either mirrored onto the operational head-end controller's storage device prior to failure, or stored on a shared storage device through a network. Thus, the method and apparatus advantageously increases the fault tolerance at the head-end by sharing the processing loads amongst head-end controllers, as well as eliminating a single fault failure at the hardware level of the head-end controllers through redundancy.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1A:
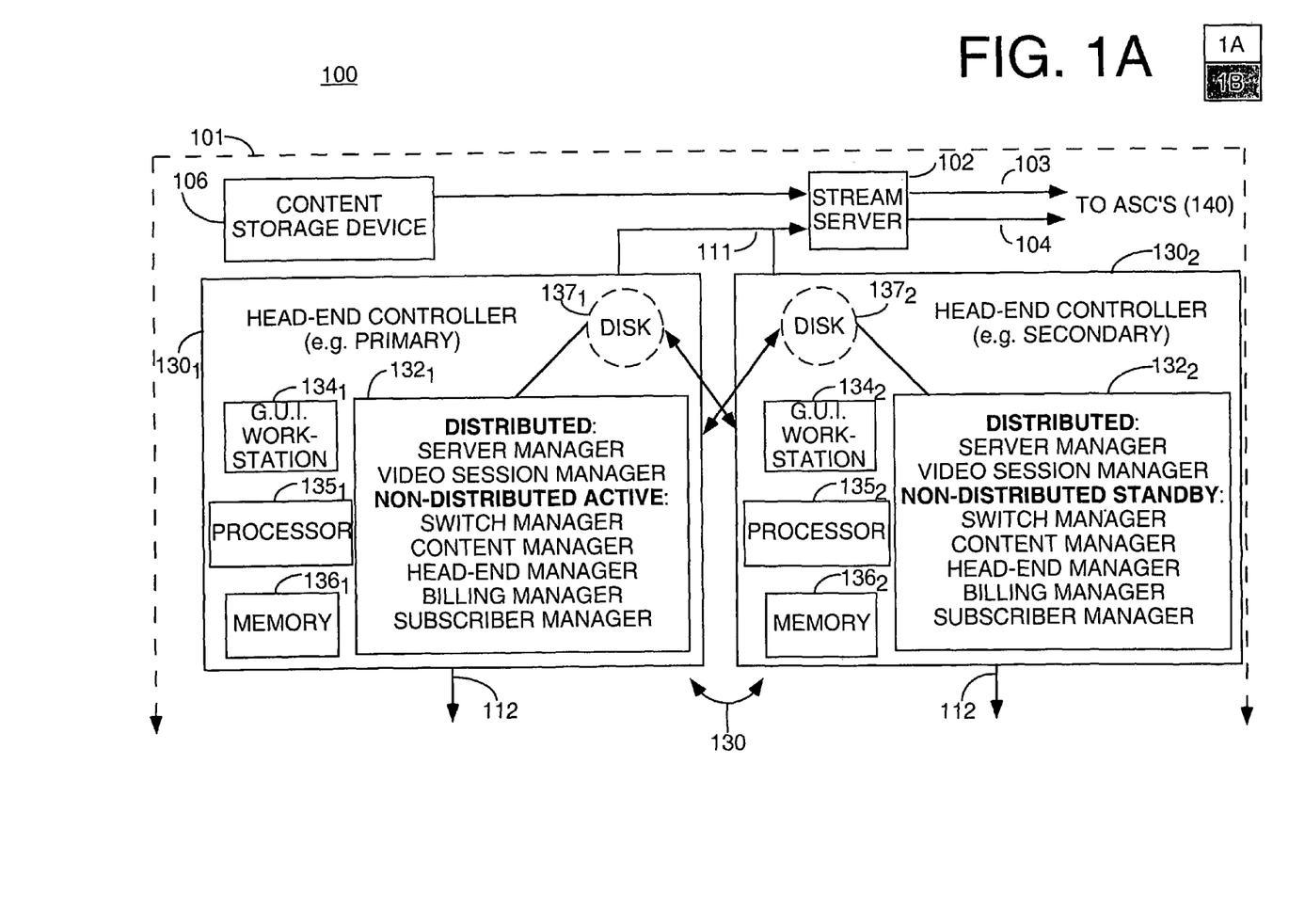
FIG. 1A and FIG. 1B together depict a high-level block diagram of a first embodiment of an interactive information distribution system.
Figure 1B:
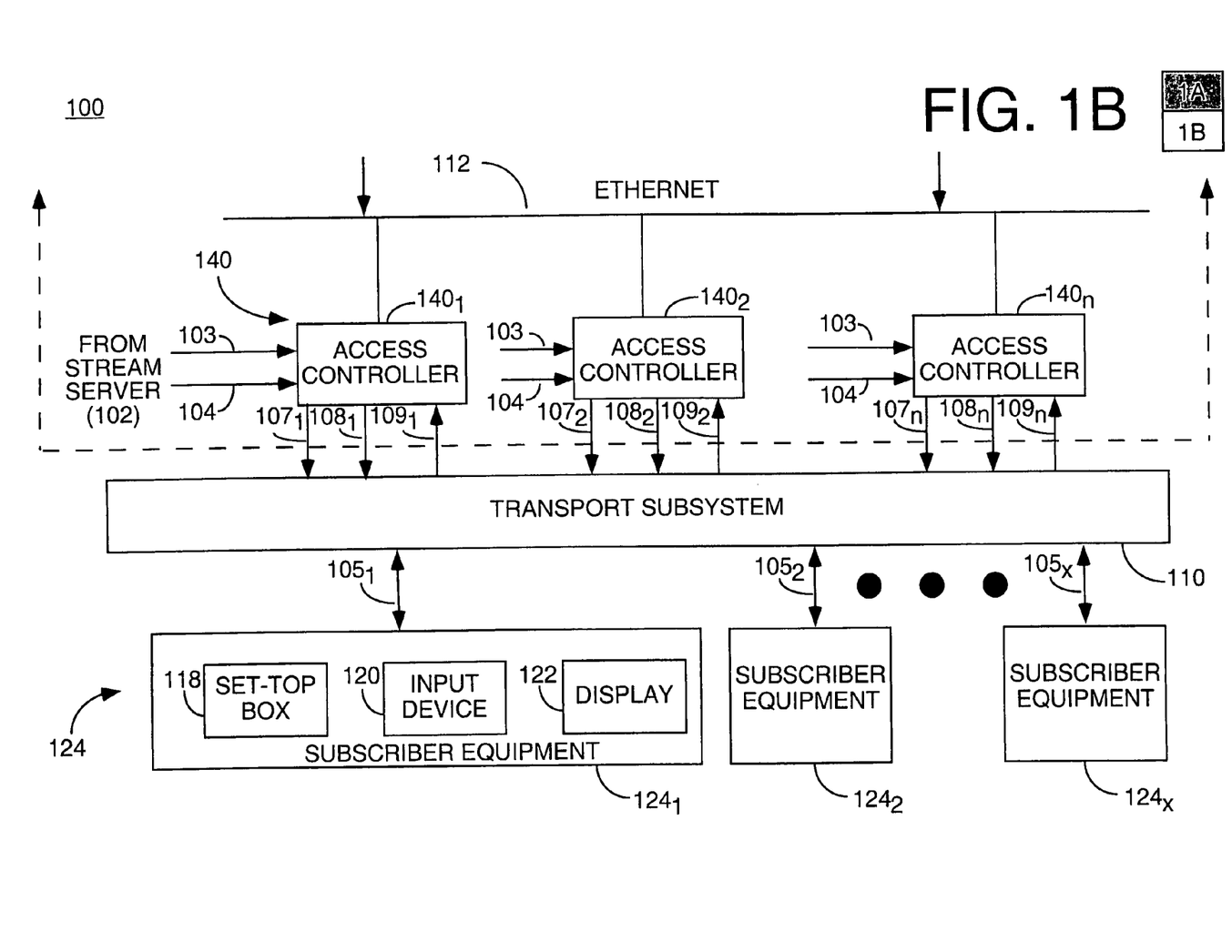

FIG. 1 depicts a high-level block diagram of an interactive information distribution system. FIG. 1 is formed by arranging FIG. 1A and FIG. 1B according to the graphics depicted in the respective figures.

The interactive information distribution system 100 of FIG. 1 comprises a head-end 101, a transport subsystem or network 110 and subscriber equipment 124. The head-end 101 receives subscriber requests for information such as movies or other content, and responsively provides or "streams" the content to the appropriate subscriber equipment 124 via a network 110.

A plurality of subscriber equipment 124-1 through 124-x (collectively subscriber equipment 124) each comprise a set-top box (STB) 118, an input device (e.g., remote control) 120 and a display device 122. Communications between the head-end 101 and the subscriber equipment 124 are transmitted across a transport system network 110 by either cable or telephone transport mediums.

The transport network 110 is typically, but not exclusively, a conventional bi-directional, hybrid fiber-coax cable network. Depending upon the fiber node size, one embodiment of the invention utilizes two to five conventional cable channels (e.g., 6 MHz bandwidth channels). Each channel is capable of downstreaming, via a plurality of downstream information channels $108_1$ through $108_n$ (collectively information channels 108), up to 10 streams of video information per channel at the same time. Assuming a 10 to 1 concentration, i.e., not all subscribers are viewing at the same time, then approximately 500 potential subscribers may be connected to each node. In addition to downstream information channels 108, the transport network 110 must also support downstream command channels $107_1$ through $107_n$ (collectively command channels 107) and upstream "back" channels $109_1$ through $109_n$ (collectively back channels 109).

The head-end 101 provides control information for transmission through the downstream command channel 107 contained within the cable transport network 110 to the subscriber equipment 124. This command and control information is transmitted illustratively, on a carrier in the range 50 to 750 MHz using a 1 MHz bandwidth, i.e., the command information is frequency multiplexed with the information channel and transmitted through the network 110. Furthermore, the subscriber equipment 124 communicates via the reverse (or back) channel 109 to the head-end 101 through the cable transport network 110. Each reverse channel carries, for example, a BPSK modulated signal on a carrier in the range 5-42 MHz, where the channel capacity is approximately 64 Kbps. Other modulation formats (e.g., QPSK at 1.5 Mbs) or channel capacities may be used. Alternatively, the plurality of data streams is multiplexed onto an optical fiber (a trunk) and each head-end 101 is connected to the trunk by a "drop line."

The subscriber equipment 124 is coupled to the transport network 110 by signal path (e.g., coaxial cable) 105-1 through 105-x (collectively signal path 105) via the set top box 118. The set top boxes 118 receive and demodulate the downstream signals including those propagated through both the command channel 107 and the information channel 108. The set top boxes optionally demodulate standard cable television signals received from the network. Thus, a single set top box can be used to receive all the cable services provided by the network. The set top boxes also provide interactive control of the information presentation. The presentation is controlled via the input device 120, e.g., an infrared (IR), radio frequency (RF), or some other remote control unit. The information, e.g., audio, video, still photographs, graphics, and other multimedia programs and the like are portrayed on the display device 122 such as a television, video monitor, stereo system, or otherwise.

The viewer selects entry into the system by manipulating the buttons (or joystick) of the remote control device 120. During the selection process, the viewer (now a potential subscriber) is presented with an on-screen browser (a graphical user interface) that aids the viewer in finding information, the prices of the selections, search aides, and the like. The commands used to navigate throughout the various menus are transmitted from the set top terminal 118 through the signal path 105 to the head-end 101 via the back channel 109. The head-end 101 responds to customer commands through the signal path 105 via the downstream command 107 and information channels 108. When the subscriber executes the navigator, a "session" is open for that particular subscriber.

The head-end 101 of the interactive information distribution system 100 comprises a stream server 102, a content storage device 106, at least two head-end controllers 130-1 and 130-2 (collectively head-end controllers 130), and a plurality of access controllers (AC) 140-1 through 140-m (collectively access controllers 140). The content storage device 106 is coupled to the stream server 102, thereby providing a repository of video assets that are available for request by the subscribers. The content storage device 106 typically contains thousands of video assets from which the subscriber may choose.

The video stream server 102 is coupled to each head-end controller 130 through signal paths 111 to allow communications of command information between the server 102 and each head-end controller 130. Additionally, the video stream server 102 is coupled to each access controller 140 to provide a plurality of packetized data streams via a signal path 104 and to provide a synchronization clock signal via signal path 103. The packetized data streams contain isochronous information as well as movies or other video assets retrieved from the video content storage device 106.

The plurality of access controllers 140 are coupled to each of the head-end controllers 130. This coupling 112 may illustratively be Ethernet or fiber channel cabling. Additionally, the plurality of access controllers 140 are coupled to the cable transport subsystem 110 through the downstream command channel 107, the information channel 108 and the back channel 109.

Furthermore, each of the plurality of access controllers 140 comprises multiplex boards, modems and other apparatus (not shown). The access controllers are primarily responsible for controlling the quadrature amplitude modulation (QAM) modulators and multiplexing boards that are used as mediums for transmitting and receiving the data between the subscriber equipment 124 and the head-end controllers 130.

Specifically, the access controllers 140 control the provisioning of video information between the server 102 and subscriber equipment 124. In the event of a head-end controller failure, the access controllers control the switching over to the operative head-end controller. Thus, by including an additional head-end controller at each head-end, fault tolerance for the system is improved.

The number of head-end controllers 130 is proportional to the number of subscribers being serviced by the system. Each head-end controller can generally service up to 500 subscribers. Additional head-end controllers 130 may be added to a head-end 101 as required.

Each of the head-end controllers 130 of the head-end 101 comprises various managing modules 132-1 and 132-2 (collectively managing modules 132), a processor 135-1 and 135-2 (collectively processors 135), and memory (e.g., RAM) 136-1 and 136-2 (collectively memory 136). A Graphic User Interface (GUI) workstation 134-1 and 134-2 (collectively GUI workstations 134) is also available for operator interaction. Additionally, FIG. 1A depicts a plurality of local storage devices 137-1 and 137-2 (collectively local storage device 137) also coupled with each head-end controller 130. Alternatively, FIG. 2A depicts a second embodiment having a central storage device 139 networked to each head-end controller 130.

The processor's 135 function is to process session-state data that is executed by the managing modules 132. The optional GUI workstation 134 is a computer interface to allow interaction with an operator.

The processor 135, memory 136 and various managing modules 132 of each head-end controller 130 are coupled together on a circuit board such as, a single compact PCI board, and stored in a rack unit. Thus, the rack unit will contain at least two head-end controllers 130 with the ability to hold additional boards as required.

Figure 2A:
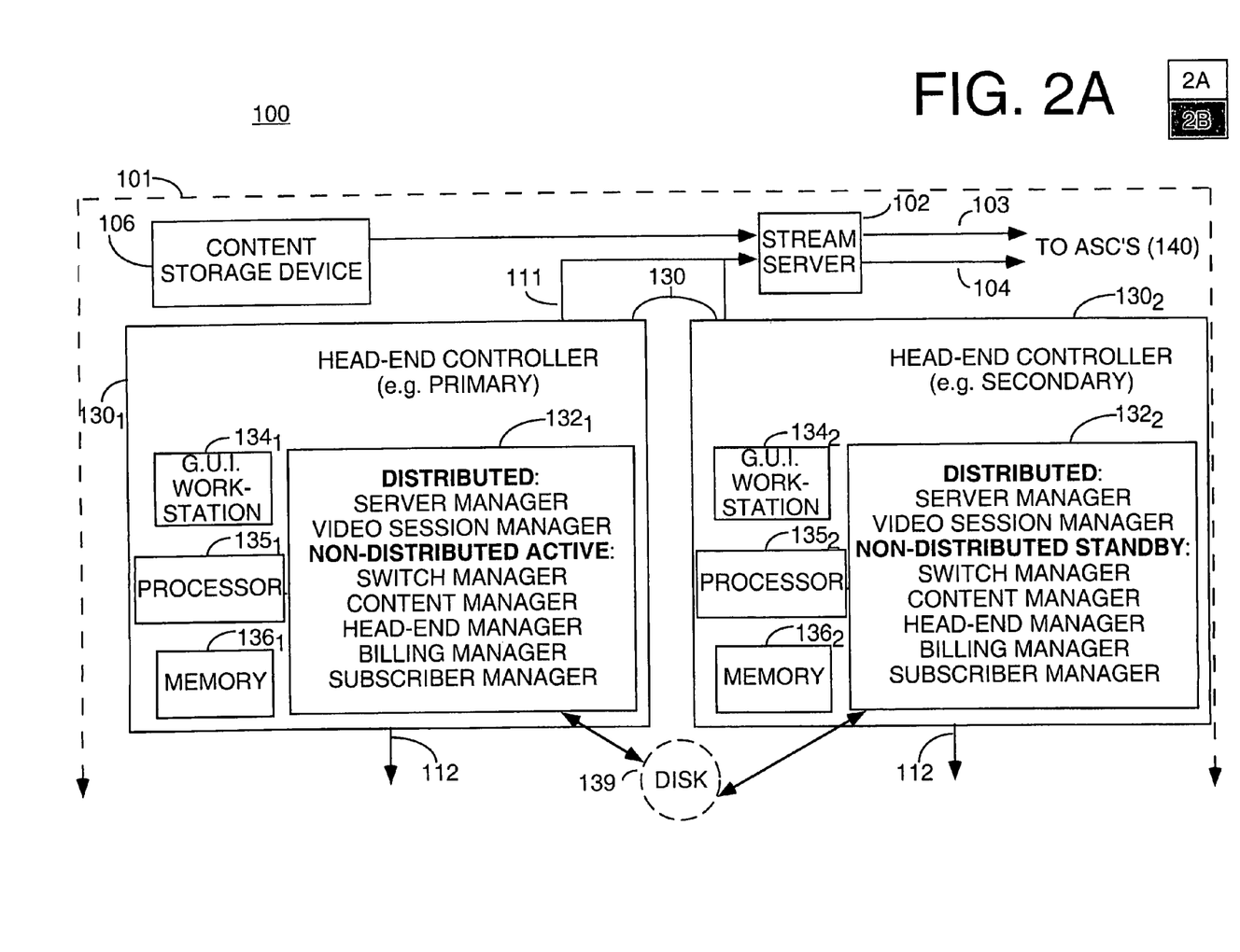
FIG. 2A and FIG. 2B together depict a high-level block diagram of a second embodiment of an interactive information distribution system.

The storage devices 137 and 139 depicted in FIGS. 1A and 2A may illustratively be either fiber channel or SCSI hard drives. Each local storage device 137, as illustrated in FIG. 1A, is coupled by a network connection to each head-end controller 130. Thus, each head-end controller 130 may access more than one storage device 137, if required.

The networked storage device 139, as illustrated in FIG. 2A, is a central storage device at the head-end 101, and connected by a network to each head-end controller 130. Thus, each head-end controller 130 shares a single storage device 139. By either method, each head-end controller 130 has access to the data stored on the storage device by the other head-end controller 130.

The various managing modules 132 within each head-end controller 130 are programs that execute session-state data. A session is the interactivity between the subscriber using their subscriber equipment 124 and the head-end 101, whereby the processing of a video request is provided. Session-state data is information that defines the state of the session. It includes who the subscribers are, which set-top boxes are active, what video asset is being watched, the addresses of the set-top boxes, which modulators are being used, which navigation screen the subscriber is watching, and similar session related information.

Data that is non-volatile is deemed as permanent session-state data that may be required frequently, long term, or in the event of a power loss. Such permanent data is written to a local storage device 137 of FIG. 1A, or the centrally networked storage device 139 of FIG. 2A. That is, once processed by the processor 135, the managing module stores the session-state data on its respective local storage device 137 or the centrally networked storage device 139.

During operation of the preferred embodiment of a head-end 101 having two head-end controllers 130-1 and 130-2, session-state data is permanently stored by writing the data to the local disc drive 137-1 (FIG. 1) that is assigned to head-end controller 130-1, and then replicating the data image periodically to the other local storage device 137-2 on secondary head-end controller 130-2. In effect, each head-end controller's local storage device has a mirror image of the other local storage disk. In the case where more than two head-end controllers 130 exist at a head-end 101, the local storage device 137 for each head end controller may be a shared device centrally located at the head-end 101.

Writing of the session-state data to the local storage devices 137 is performed via the managing module that is currently managing the data. Although writing of the session-state data may be performed in real time, it is not necessary since each storage device 137 is periodically updated with the session-state data from the other storage device. Moreover, the periodic updates occur in frequent intervals, thus allowing enough session-state data from the primary head-end controller 130 to be stored on the storage device 137 of the secondary head-end controller to avoid a system "crash" in the event of a primary head-end controller 130 failure.

However, the session-state data must be accessed in real time. After the session-state data is stored, access to the fixed storage devices may be made through the managing module requiring the information. By utilizing a local storage device 137 for each head-end controller 130, only a minimal amount of session-state data will be lost in the event of a primary head-end controller failure.

Figure 2B:
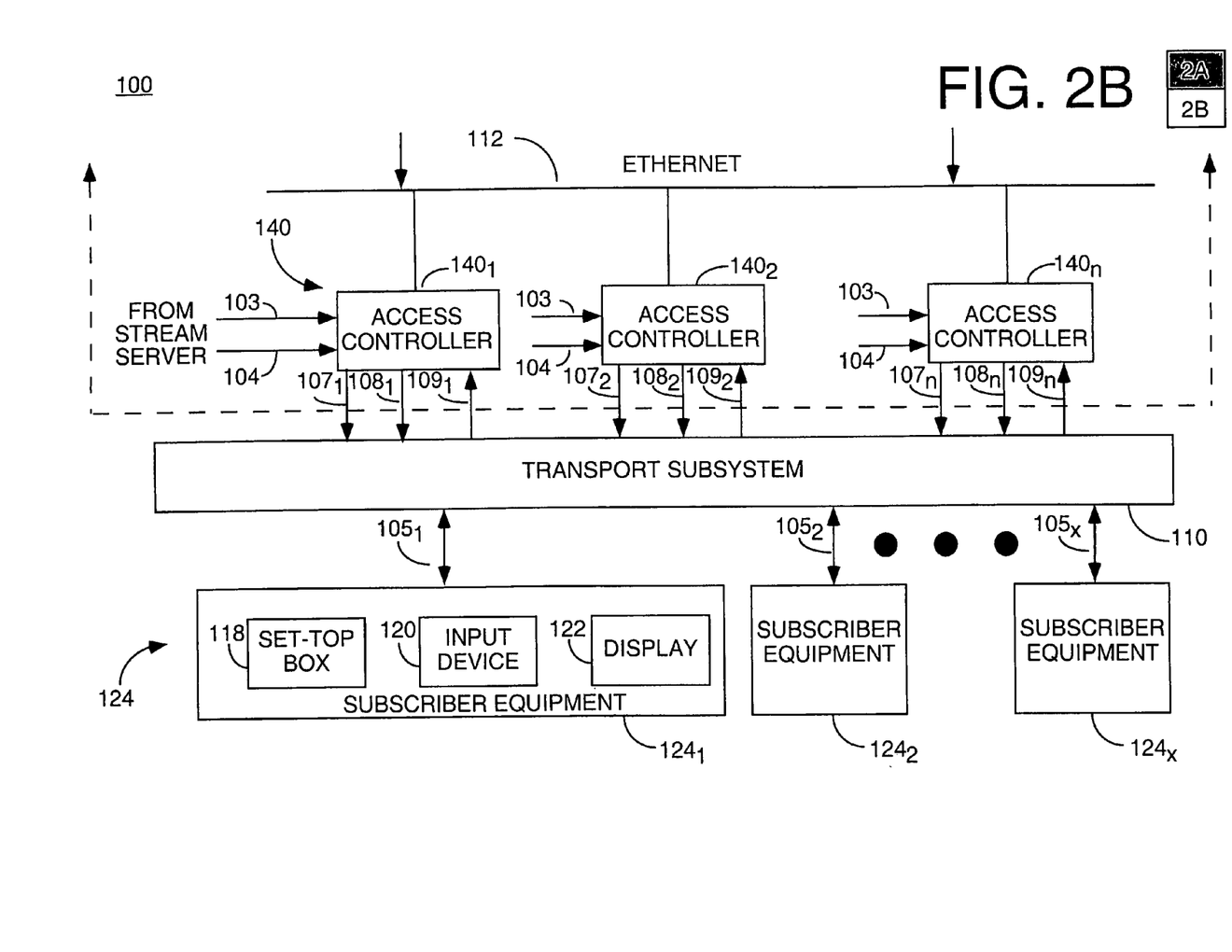

Alternatively, as shown in FIG. 2, the system 100 permits the processor 135 to directly access the centrally networked storage device 139 to read the required session-state data. This latter method is much faster and thereby assists in keeping the processing of data synchronized and accessed in real time. Furthermore, by utilizing a centrally networked storage device 139, no session-state data will be lost in the event of a primary head-end failure, since the system does not have to rely on frequently made content updates to other storage devices.

Volatile session-state data is data that does not require permanent storage on a permanent storage device 137. Rather, after execution by a managing module, the session-state data is stored temporarily in the RAM 136 by the processor 135 and later discarded. Referring to FIG. 1, non-permanent session-state data executed by the managing modules 132-1 at the primary head-end controller 130-1 is stored on the corresponding memory 136-1. Copies of the non-permanent session-state data are made and transferred periodically in frequent intervals during each session instance, from the current processing head-end controller (i.e., primary head-end controller 130-1) to the other head-end controller (i.e., secondary head-end controller 130-2) as a method of redundant data storage. In an instance where the primary head-end controller 130-1 fails, the secondary head-end controller 130-2 will utilize the most current session-state data from the primary head-end controller 130-1. Updating the RAM 136 at each head-end controller 130 is frequent enough to avoid a system crash in the event of such primary head-end controller failure.

Synchronization at the memory may be accomplished by writing and reading to and from the RAM 136 directly from the processor 135 without having to go through the managing module 132. The data in the RAM 136 at each head-end controller 130 may be transferred illustratively, via the Ethernet transport medium 112 coupling the primary and secondary head-end controllers 130, or via a common bus between the processors 135 and RAM 136 of both head-end controllers. With each update, the secondary head-end controller 130-2 stores this information on the corresponding RAM 136-2, thereby having the executed session-state data available should a fault occur in the primary head-end controller. Thus, each memory device 136 is updated with a mirror image of the memory devices from other head-end controllers 130.

Referring back to FIG. 1A, each head-end controller 130 has a variety of managing modules 132 stored thereon. Each managing module has a distinct function for managing and processing specific data at different times. For example, a portion of the managing modules are dedicated to processing session-state data that is generated during the subscriber's requests for video content. Other managing modules manage video asset allocation and storage at either the head-end or some other remote location. Still, others manage the subscriber equipment and billing requirements.

This method of improving the fault-tolerance, that is, by adding redundant hardware at the head-end, has an additional feature that provides for the sharing of the processing loads prior to storing the processed data. Specifically, some of the managing modules have the ability to process data on more than one head-end controller at a time. These managing modules are termed "distributed," since each instance of the managing module is processing a subset of the session-state data. Session-state data that is processed by a distributed managing module is concurrently being processed at the primary head-end controller processor 135-1 and processed at the secondary head-end controller processor 135-2.

The session-state data processed by the primary head-end controller 130-1 is stored on its dedicated fixed storage device 137-1 and memory 136-1. Likewise, the session-state data processed by the secondary head-end controller 130-2 is stored on its dedicated fixed storage device 137-2 and memory 136-2. In this fashion, the time to process data via a distributed managing module is beneficially reduced almost in half.

Another method of processing session-state data is by means of a "non-distributive" managing module. Session-state data processed by non-distributive managing modules is processed at a primary head-end controller where the processor is said to be in an active mode and corresponding to that specific data being processed. The secondary head-end controller in this instance is not processing that specific data concurrently and is set in a standby mode. In this manner, a processor 135 of a head-end controller 130 is always processing data as a primary processor while also serving as a secondary head-end controller in standby mode.

In the event the second head-end controller 130-2 should become inoperable during the processing of data executed by either of these distributive managing modules, then the first head-end controller 130-1 will continue to process the session-state data. This is accomplished by retrieving the latest updates of the previously processed and stored data on the second head-end controller's storage device 137-2. In this first embodiment, some minimal amount of session-state data may be lost. However, by utilizing a centrally networked storage device as depicted the second embodiment shown in FIGS. 2A and 2B, all previous session-state data is available for continued processing by a secondary head-end controller, in the event of a primary head-end controller failure.

In the instance where the data being processed is through a non-distributive managing module such as the content manager or subscriber manager, then the processing occurs by the head-end controller designated to the access controller associated with the requesting subscriber. For example, a subscriber sends a request for video information that is routed through the first access controller 140-1. The first head-end controller 130-1 is assigned to that access controller 140-1. As such, the primary head-end controller 130-1 and its corresponding subscriber manager located thereon processes such a request and then stores the session-state data produced by the subscriber manager on the corresponding storage device 137-1 and memory device 136-1.

At the same time, the subscriber manager located on the second head-end controller 130-2 does not process the data but remains in a standby mode. If the primary head-end controller 130-1 becomes inoperable while processing such data, then the access controller 140 dedicated to the requesting subscriber diverts data traffic to the secondary head-end controller 130-2, and the subscriber manager on the secondary head-end controller 130-2 becomes active. The subscriber manager on the secondary head-end controller 130-2 then retrieves the stored session-state data from the primary head-end storage device 137-1 and memory device 136-1 for continued processing. Again, a minimal amount of session-state data may not be recovered in the instance where each head-end controller 130 utilizes a local storage device 137 as depicted in FIGS. 1A and 1B. However, all the executed data will be recoverable in the instance where a centrally networked storage device 139 is utilized, as depicted in FIGS. 2A and 2B.

Common to all of these managing functions is that data at each head-end controller 130 is constantly being processed by it's respective processor 135 and stored either temporarily on it's random access memory 136 or permanently on it's permanent storage device 137 or 139 of FIG. 1A or 2A. Therefore, in the event one of the head-end controllers 130 becomes inoperable during a subscriber session, the redundant head-end controller 130 can access the memory and storage device of the inoperable head-end controller. Where the storage device 137 is local to each head-end controller 130, processing the session-state data will continue with minimal interruption to the system or subscriber. In the instance where the storage device 139 is centrally networked to each head-end controller 130, then processing of session-state data will resume without any interruption.

Figure 3A:
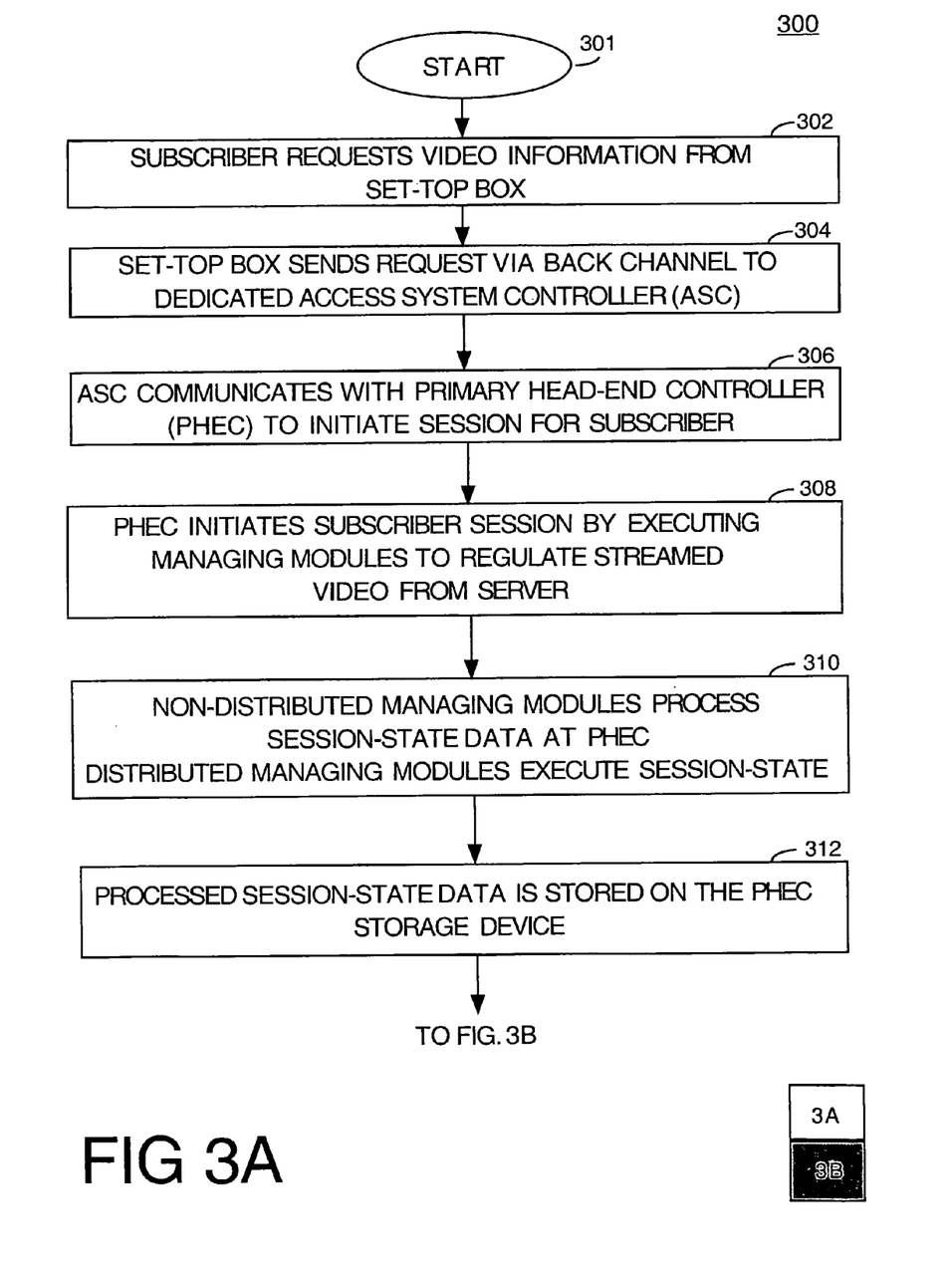
FIG. 3A and FIG. 3B together depict a flowchart of a method that facilitates fault tolerance at a head-end of an interactive information distribution system.
Figure 3B:
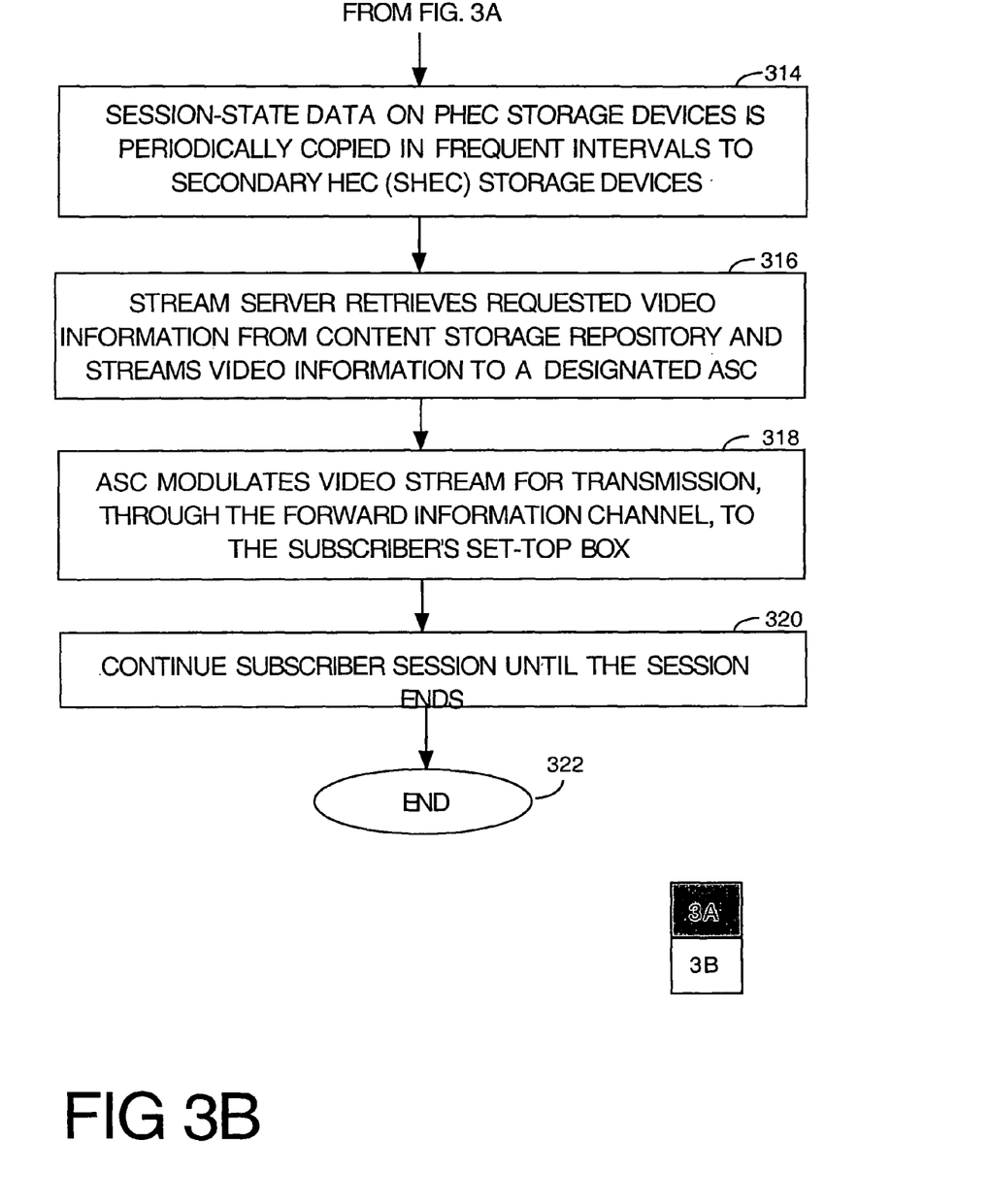

FIGS. 3A and 3B (collectively FIG. 3) depict a flowchart of a method 300 that facilitates fault tolerance at a head-end of an interactive information distribution system. A normal mode of operation, i.e., no failure occurring at the primary head-end controller, is depicted by the flowchart of FIG. 3.

A subscriber in an interactive information distribution system, such as a video-on-demand system, starts the method at step 301, and the method proceeds to step 302 where the subscriber requests video information from their subscriber equipment, i.e., a set-top box. In step 304, the set-top box sends the request through the back channel, to the access system controller dedicated to such set-top box. In step 306, the access system controller receives the subscriber's request and then signals the primary head-end controller to initiate a subscriber session. In step 308, the primary head-end controller initiates the subscriber session through the managing modules that regulate the stream server's video transmissions at the head-end.

In step 310, non-distributed managing modules of the primary head-end controller and the distributed managing modules of both the primary and secondary head-end controllers process the session-state data. In step 312, the session-state data is stored on the primary head-end memory and storage devices. The memory and storage devices include RAM and either a local or centrally networked disk drive, as depicted in FIGS. 1A and 2A, respectively. The session-state data stored on the primary head-end storage devices is replicated, in step 314, onto the storage devices of the secondary head-end controller, where the storage devices are local to each head-end controller, as depicted in FIGS. 1A and 1B. The replication is performed in frequent intervals to provide current session-state data for redundancy purposes in the event of a primary head-end failure. Where the storage device is centrally networked between the primary and secondary head-end controllers as in FIGS. 2A and 2B, then the step 314 is excluded from the routine 300. Step 314 is excluded in this instance since the secondary head-end controller has ubiquitous access to the central storage device that concurrently stores the session-state data created by all the head-end controllers, including the primary head-end controller.

During the processing of the session through the managing modules, in step 316, the plurality of managing modules direct the stream server to retrieve the requested video information from the video content repository and stream the video information to the designated access controller. In step 318, the access controller receives the streamed video information from the server, and then modulates the video information for transmission through the forward channel to the set-top box of the subscriber. The primary head-end controller continues to manage the subscriber's session at step 320, until the session ends, in step 322.

Figure 4:
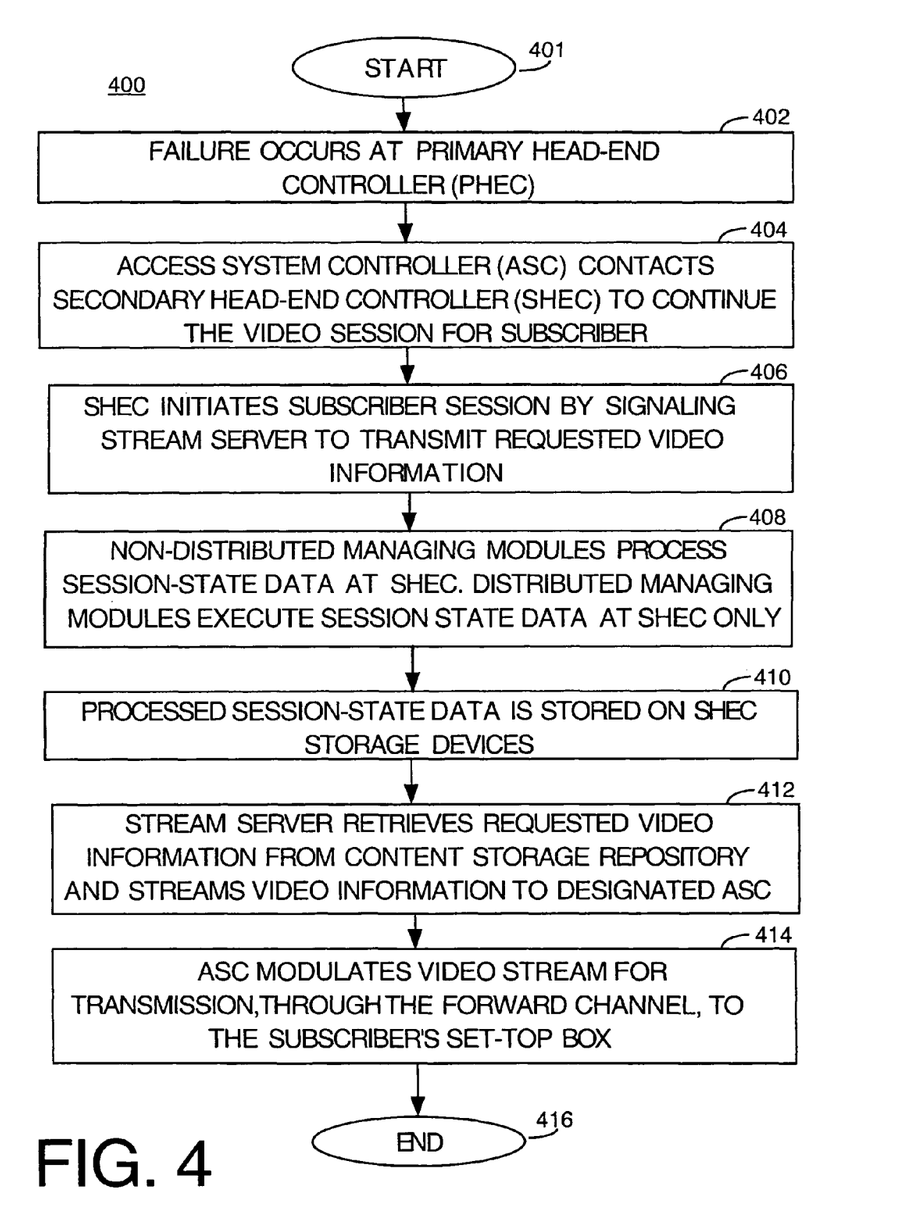
FIG. 4 depicts a flowchart of a method for continuing a subscriber session during a failure mode of operation at a head-end controller.

FIG. 4 depicts a flowchart of a method for continuing a subscriber session during a failure mode of operation at a head-end controller. In a failure mode of operation, a failure occurs at the primary head-end controller designated to facilitate a subscriber session. In this instance, the secondary head-end controller retrieves the processed session-state data from the fixed storage device and memory of the primary head-end controller in order to continue the subscriber session.

The failure mode of operation begins at step 401 and proceeds to step 402, where a failure occurs at the primary head-end controller. The failure is detected in an interrupt driven manner from the dedicated access controller previously interfacing with the primary head-end controller. In step 404, the access controller contacts the secondary head-end controller to continue the subscriber's video session. The routine 400 proceeds to step 406 where the managing modules of the secondary head-end controller retrieve the latest session-state data available from the primary head-end controller. The data is stored in either the memory and storage devices of the primary head-end controller shown in FIGS. 1A and 1B, or the centrally networked storage device shown in FIGS. 2 and 2B.

Once the session-state data from the primary head-end controller is accessed, in step 408, both the non-distributed and distributed managing modules of the secondary head-end process the recovered session-state data. In this manner, there is minimal interruption to the subscriber's video session. Thereafter, in step 410, the secondary head-end controller continues the subscriber's session and stores the session-state data on the memory and storage devices of the secondary head-end controller.

During the execution of the session by the managing modules, in step 412, the managing modules continue to direct the stream server to retrieve the requested video information from the video content repository, and stream the video information to the access controller designated to the subscriber. In step 414, the access controller receives the streamed video information from the server and modulates the video information for transmission through the forward information channel, to the set-top box of the subscriber. The secondary head-end controller continues to manage the subscriber's session in step 414, until the session ends, at step 416.

Thus, fault tolerance is achieved by adding additional head-end controllers to each head-end. This allows for the replicating of processed information onto the memory and storage devices of the secondary head-end controller. By utilizing the methods and apparatus disclosed herein, a subscriber using this improved fault tolerant system will be ensured minimal disruptions to their viewing requirements. Furthermore, the implementation of load sharing between two or more head-end controllers decreases the processing time, increases the availability of video information and allows for greater expansion of viewership. Although various embodiments that incorporate the teachings of the present invention have been shown and described in detail herein, those skilled in the art can readily devise many other varied embodiments that still incorporate these teachings.

What is claimed is:

1. A method of distributing and sharing processing loads and increasing fault tolerance between provider equipment and subscriber equipment of an interactive information distribution system, comprising the steps of:
receiving, at a head-end, a request for video information from said subscriber equipment;
executing a video session from at least one of a plurality of managing modules on a primary head-end controller at said head-end;
dedicating, at said head-end, at least one secondary head-end controller respectively having said at least one managing module as a resource for executing said video session, wherein said executing said video session comprises concurrently processing different sub-parts of session-state data of said video session at said primary head-end controller and said at least one secondary head-end controller using a distributed managing module associated with each of said primary head-end controller and said at least one secondary head-end controller;
storing said session-state data from said executed video session on at least one storage device; and
streaming, from a stream server, said video information to said requesting subscriber equipment during a normal mode of operation.

2. The method of claim 1, wherein said executing said video session further comprises executing said video session on at least one non-distributed managing module associated with said primary head-end controller.

3. The method of claim 2, comprising the steps of:
processing said session-state data through said at least one distributed managing module concurrently on said primary head-end controller and said at least one secondary head-end controller, wherein said at least one distributed managing module on said primary head-end controller and said at least one secondary head-end controller is in an active mode; and
processing said session-state data from said at least one non-distributed managing module on said primary head-end controller, wherein said at least one non-distributed managing module on said primary head-end controller is in an active mode, and wherein said at least one non-distributed managing module on said secondary head-end controller is in a standby mode.

4. The method of claim 3, a method comprising the steps of:
processing said session-state data produced by said primary head-end controller via said at least one secondary head-end controller in a failure mode of operation, wherein said primary head-end controller becomes inoperative.

5. The method of claim 4, comprising the steps of:
streaming video information from a stream server to an access controller in said normal mode of operation, wherein said primary head-end controller manages said video session between said stream server and at least one access controller; and
streaming video information from said stream server to said access controller in said failure mode of operation, wherein said secondary head-end controller manages said video session between said stream server and said access controller.

6. The method of claim 1, comprising the steps of:
storing said session-state data produced by said primary head-end controller on at least one non-volatile storage device coupled to said primary head-end controller; and
storing said session-state data produced by said at least one secondary head-end controller on at least one non-volatile storage device coupled to said primary head-end controller.

7. The method of claim 6, wherein said at least one storage device comprises a plurality of storage devices, said method further comprising the step of:

replicating said stored session-state data from one of said plurality of storage devices coupled to said primary head-end controller, to each of the remaining storage devices of said plurality of storage devices coupled to said at least one secondary head-end controller; and wherein said at least one secondary head-end controller retrieves said session-state data executed by said managing modules of said primary head-end controller for continuing said video session with said subscriber equipment.

8. The method of claim 1, further comprising the steps of:

storing said session-state data produced by said primary head-end controller on a volatile memory device coupled to said primary head-end controller; and storing said session-state data produced by said at least one secondary head-end controller on said volatile memory device coupled to said primary head-end controller.

9. The method of claim 8, comprising the step of:

replicating said stored session-state data from said volatile memory device coupled to said primary head-end controller, to at least one volatile memory device coupled to said at least one secondary head-end controller; and wherein said at least one secondary head-end controller retrieves said session-state data executed by said managing modules of said primary head-end controller for continuing said video session with said subscriber equipment.

10. In an interactive video distribution system including information provider equipment and subscriber equipment, apparatus comprising:

a stream server;

a plurality of head-end controllers, coupled to said stream server, for managing a video session at a head-end, each head-end controller comprising a plurality of managing modules for executing session-state data of said video session, wherein at least one of said managing modules is a distributed managing module and processes different sub-parts of said session-state data of said video session using at least two of said plurality of head-end controllers; and a plurality of access controllers, coupled to said plurality of head-end controllers, for interacting with said subscriber equipment during said video session to responsively provide video information to said subscriber equipment upon a request for video information from said subscriber equipment.

11. The apparatus of claim 10, wherein each head-end controller of said plurality of head-end controllers further comprises:

a processor for processing session-state data produced by said plurality of managing modules; and memory devices, coupled to said processor, for temporarily storing said session-state data.

12. The apparatus of claim 11 wherein said plurality of head-end controllers comprises a primary head-end controller and at least one secondary head-end controller.

13. The apparatus of claim 12, wherein:

in a normal mode of operation, said primary head-end controller interacts with said stream server to provide said video information to said subscriber equipment, and said at least one secondary head-end controller remains in a standby mode; and in a failure mode of operation, said primary head-end controller is inoperative, and said at least one secondary head-end controller interacts with said stream server to provide video information to said subscriber equipment.

14. The apparatus of claim 13, wherein said plurality of managing modules comprise:

at least one non-distributed managing module, for processing session-state data by said primary head-end controller.

15. The apparatus of claim 14, wherein:

in a failure mode of operation, a portion of said plurality of access controllers coupled to said inoperable primary head-end controller interface with said secondary head-end controller, whereby all of said plurality of access controllers are interfacing with said at least one secondary head-end controller, to responsively interact with said subscriber equipment.

16. The apparatus of claim 15, wherein:

in a failure mode of operation, said at least one distributed managing module and said at least one non-distributed managing module executes said video session through said at least one secondary head-end controller.

17. The apparatus of claim 16 further comprising:

a centrally networked storage device coupled to said primary head-end controller and said at least one secondary head-end controller, for centrally storing said session-state data produced by said plurality of managing modules; and in said failure mode of operation, said at least one secondary head-end controller retrieves said session-state data stored on said centrally networked storage device by said primary head-end controller, for continued interaction with said stream server to provide said video information to said subscriber equipment.

18. The apparatus of claim 16, further comprising:

a plurality of local storage devices, coupled to said primary head-end controller and said at least one secondary head-end controller, for locally storing said session-state data produced by said plurality of managing modules.

19. The apparatus of claim 18, wherein:

said session-state data is replicated from one of said plurality of local storage devices coupled to said primary head-end controller, and stored on the remaining plurality of local storage devices of said at least one secondary head-end controller.

20. The apparatus of claim 19, wherein:

in a failure mode of operation, said at least one secondary head-end controller retrieves said replicated session-state data stored on said remaining plurality of storage devices, for continued interaction with said stream server to provide said video information to said subscriber equipment.

* * * * *